(12) United States Patent
Ito

(10) Patent No.: US 11,492,004 B2
(45) Date of Patent: Nov. 8, 2022

(54) AUTOMATED DRIVING SYSTEM, PORTABLE DEVICE AND TRAVEL CONTROL DEVICE

(71) Applicant: TOYOTA JIDOSHA KABUSHIKI KAISHA, Toyota (JP)

(72) Inventor: Hironori Ito, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 16/986,397

(22) Filed: Aug. 6, 2020

(65) Prior Publication Data

US 2021/0046949 A1 Feb. 18, 2021

(30) Foreign Application Priority Data

Aug. 14, 2019 (JP) .............................. JP2019-148803

(51) Int. Cl.
*B60W 50/14* (2020.01)
*B60W 60/00* (2020.01)

(52) U.S. Cl.
CPC ........ *B60W 50/14* (2013.01); *B60W 60/0055* (2020.02); *B60W 60/0059* (2020.02); *B60W 2552/05* (2020.02)

(58) Field of Classification Search
None
See application file for complete search history.

(56) References Cited

U.S. PATENT DOCUMENTS

2019/0294163 A1* 9/2019 Ueno ....................... G08G 1/16

FOREIGN PATENT DOCUMENTS

| JP | 2017100659 A | 6/2017 |
| JP | 2017117489 A | 6/2017 |
| JP | 2018132533 A | 8/2018 |
| JP | 2019-21229 A | 2/2019 |

(Continued)

OTHER PUBLICATIONS

Bruce, Ivy. Howto Shut off Annoying Useless Notification of Android, May 30, 2014, https://www.recovery-android.com/shut-off-useless-notification-of-android.html. (Year: 2014).*

(Continued)

*Primary Examiner* — Abdhesh K Jha
*Assistant Examiner* — Andrew Sang Kim
(74) *Attorney, Agent, or Firm* — Dickinson Wright, PLLC

(57) ABSTRACT

The automated driving system automatically drives a vehicle by cooperative operation of a travel control device controlling travel of the vehicle and a portable device possessed by a driver of the vehicle. In the cooperative operation, the portable device transmits route data to the travel control device; the travel control device sets an event location on the route, based on the route data, controls travel of the vehicle in an automated-driving control area, based on the route data and circumstance data, and transmits notification data for notifying the driver of a change of a travel condition to the portable device; and the portable device notifies the driver of the change, based on the notification data. Upon receiving an operational input to stop the cooperative operation, the portable device notifies the driver of a warning message or ignores the received operational input if the event location is set in the area.

6 Claims, 7 Drawing Sheets

(56) References Cited

FOREIGN PATENT DOCUMENTS

| | | |
|---|---|---|
| WO | 2018/025414 A1 | 2/2018 |
| WO | 2018/100725 A1 | 6/2018 |
| WO | 2018/105074 A1 | 6/2018 |
| WO | 2018/135318 A1 | 7/2018 |

OTHER PUBLICATIONS

Apple. Asking Permission to Use Notifications, Jun. 16, 2019, https://web.archive.org/web/20190616055436/https://developer.apple.com/documentation/usernotifications/asking_permission_to_use_notifications. (Year: 2019).*

* cited by examiner

AUTOMATED DRIVING SYSTEM, PORTABLE DEVICE AND TRAVEL CONTROL DEVICE

CROSS-REFERENCE TO RELATED APPLICATION

This application claims priority to Japanese Patent Application No. 2019-148803 filed on Aug. 14, 2019, and is incorporated herein by reference in its entirety.

FIELD

The present invention relates to an automated driving system, a portable device and a travel control device.

BACKGROUND

A technique is known to control travel of a vehicle by a travel control device along a route from a starting point to a destination (hereinafter, such a control will also be referred to as "automated driving."). Further, a technique is now under study to make a portable device possessed by a driver of a vehicle cooperate with a travel control device to automatically drive the vehicle more efficiently.

Japanese Unexamined Patent Publication No. 2017-100659 (referred to as Patent Literature 1) describes an automated driving device which acquires mode data for specifying an automated driving mode from a portable storage medium and sets the automated driving mode with reference to the acquired mode data.

SUMMARY

When a portable device is used to cooperate with a travel control device to automatically drive a vehicle, the portable device consumes more electric power as compared to the case without such cooperation. For this reason, the driver may stop the cooperation of the portable device and the travel control device.

According to the technique described in Patent Literature 1, it is determined whether or not a portable device is brought on the driver's seat of a vehicle, and if so, the driving mode of the travel control device is decided based on the driving mode stored in the portable device. The technique described in Patent Literature 1 is based on the assumption that the cooperation of the portable device and the travel control device is not stopped.

It is an object of the present invention to provide an automated driving system which can appropriately change the travel condition of a vehicle.

The automated driving system is a system including a travel control device controlling travel of a vehicle, and a portable device possessed by a driver of the vehicle, and automatically driving the vehicle by cooperative operation of the travel control device and the portable device. In the cooperative operation, the portable device transmits route data indicating a route from a starting point to a destination to the travel control device; the travel control device sets an event location on the route, based on the route data, the event location being a location where a travel condition of the vehicle is changed, controls travel of the vehicle in an automated-driving control area of the route from the present position of the vehicle to a position at a predetermined distance ahead thereof, based on the route data and circumstance data indicating circumstances around the vehicle, the circumstance data being acquired by a circumstance sensor, and transmits notification data for notifying the driver of a change of the travel condition to the portable device; and the portable device notifies the driver of the change of the travel condition, based on the notification data. Upon receiving an operational input to stop the cooperative operation, the portable device notifies the driver of a warning message or ignores the received operational input if the event location is set in the automated-driving control area.

Preferably, in the automated driving system, the warning message is a message asking for consent of the driver to stop the cooperative operation, and the portable device stops the cooperative operation if the consent of the driver is confirmed.

A portable device is a device for automatically driving a vehicle by cooperative operation with a travel control device controlling travel of the vehicle, and including: a route-data transmitting unit which transmits, in the cooperative operation, route data indicating a route from a starting point to a destination to the travel control device; a travel-condition notifying unit which notifies, in the cooperative operation, a driver of the vehicle that a travel condition of the vehicle is changed, based on notification data received from the travel control device; an event-location acquiring unit which acquires, in the cooperative operation, data indicating an event location from the travel control device, the event location being a location where a travel condition of the vehicle is changed and being set based on the route data; and an operating unit wherein upon receiving an operational input to stop the cooperative operation, the operating unit notifies the driver of a warning message or ignores the received operational input if the event location is set in an area of the route from the present position of the vehicle to a position at a predetermined distance ahead thereof.

The automated driving system is a system including a travel control device controlling travel of a vehicle, and a portable device possessed by a driver of the vehicle, and automatically driving the vehicle by cooperative operation of the travel control device and the portable device. In the cooperative operation, the portable device transmits route data indicating a route from a starting point to a destination to the travel control device; the travel control device sets an event location on the route, based on the route data, the event location being a location where a travel condition of the vehicle is changed, controls travel of the vehicle in an automated-driving control area of the route from the present position of the vehicle to a position at a predetermined distance ahead thereof, based on the route data and circumstance data indicating circumstances around the vehicle, the circumstance data being acquired by a circumstance sensor, and transmits notification data for notifying the driver of a change of the travel condition to the portable device; and the portable device notifies the driver of the change of the travel condition, based on the notification data. The travel control device requests the portable device to start the cooperative operation if the event location is set in the automated-driving control area and if the cooperative operation is not performed.

Preferably, in the automated driving system, the travel control device transmits an event ending notice to the portable device when the travel control device requests the portable device to start the cooperative operation and the change of the travel condition of the vehicle at the event location is finished, and upon receiving the event ending notice, the portable device returns to the state prior to the start of the cooperative operation.

The travel control device is a device for automatically driving a vehicle by cooperative operation with a portable device possessed by a driver of the vehicle, and including: an event-location setting unit which receives, in the cooperative operation, route data indicating a route from a starting point to a destination from the portable device and sets an event location on the route, based on the received route data, the event location being a location where a travel condition of the vehicle is changed; a travel control unit which controls, in the cooperative operation, travel of the vehicle in an automated-driving control area of the route from the present position of the vehicle to a position at a predetermined distance ahead thereof, based on the route data and circumstance data indicating circumstances around the vehicle, the circumstance data being acquired by a circumstance sensor; a notification-data transmitting unit which transmits, in the cooperative operation, notification data for notifying the driver of a change of the travel condition to the portable device; and a cooperation requesting unit which requests the portable device to perform the cooperative operation if the event location is set in the automated-driving control area and if the cooperative operation is not performed.

The automated driving system can appropriately change the travel condition of a vehicle.

BRIEF DESCRIPTION OF DRAWINGS

Other features and advantages of the present invention will be apparent from the ensuing description, taken in conjunction with the accompanying drawings, in which.

DESCRIPTION OF EMBODIMENTS

Hereinafter, with reference to the accompanying drawings, an automated driving system, a portable device, and a travel control device will be explained in detail. However, note that the present invention is not limited to the drawings or the embodiments described below.

The automated driving system automatically drives a vehicle by cooperative operation of a travel control device controlling travel of the vehicle and a portable device possessed by a driver of the vehicle. In the automated driving system, the portable device and the travel control device perform the cooperative operation as follows. First, the portable device transmits route data indicating a route from a starting point to a destination to the travel control device. The travel control device sets an event location on the route, based on the route data, the event location being a location where a travel condition of the vehicle is changed. The travel control device also controls travel of the vehicle in an automated-driving control area of the route from the present position of the vehicle to a position at a predetermined distance ahead thereof, based on the route data and circumstance data indicating circumstances around the vehicle, the circumstance data being acquired by a circumstance sensor installed in the vehicle. The travel control device also transmits notification data for notifying the driver of a change of the travel condition to the portable device. The portable device then notifies the driver of the change of the travel condition, based on the notification data.

In the cooperative operation in the automated driving system, upon receiving an operational input to stop the cooperative operation, the portable device ignores the received operational input if the event location is set in the automated-driving control area.

The travel control device also requests the portable device to perform the cooperative operation if the cooperative operation in the automated driving system is not performed and if the event location is set in the automated-driving control area.

By these operations, the automated driving system can appropriately change the travel condition of a vehicle.

Hereinafter, an embodiment in which the automated driving system is included in a vehicle will be explained. The automated driving system automatically drives a vehicle so that it travels along a route.

Figure 1:
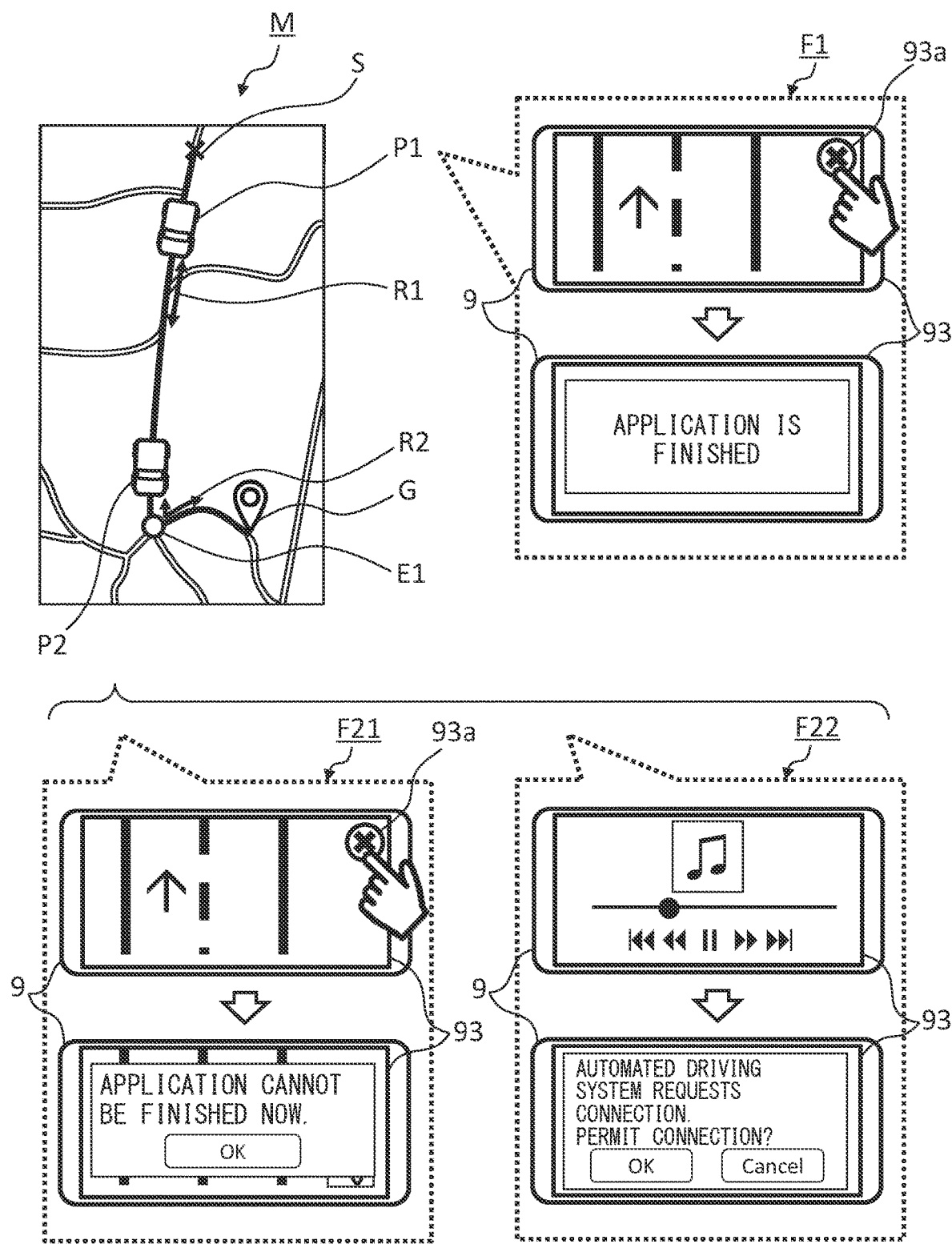
FIG. 1 is a diagram for briefly explaining the operations of the automated driving system.
Figure 2:
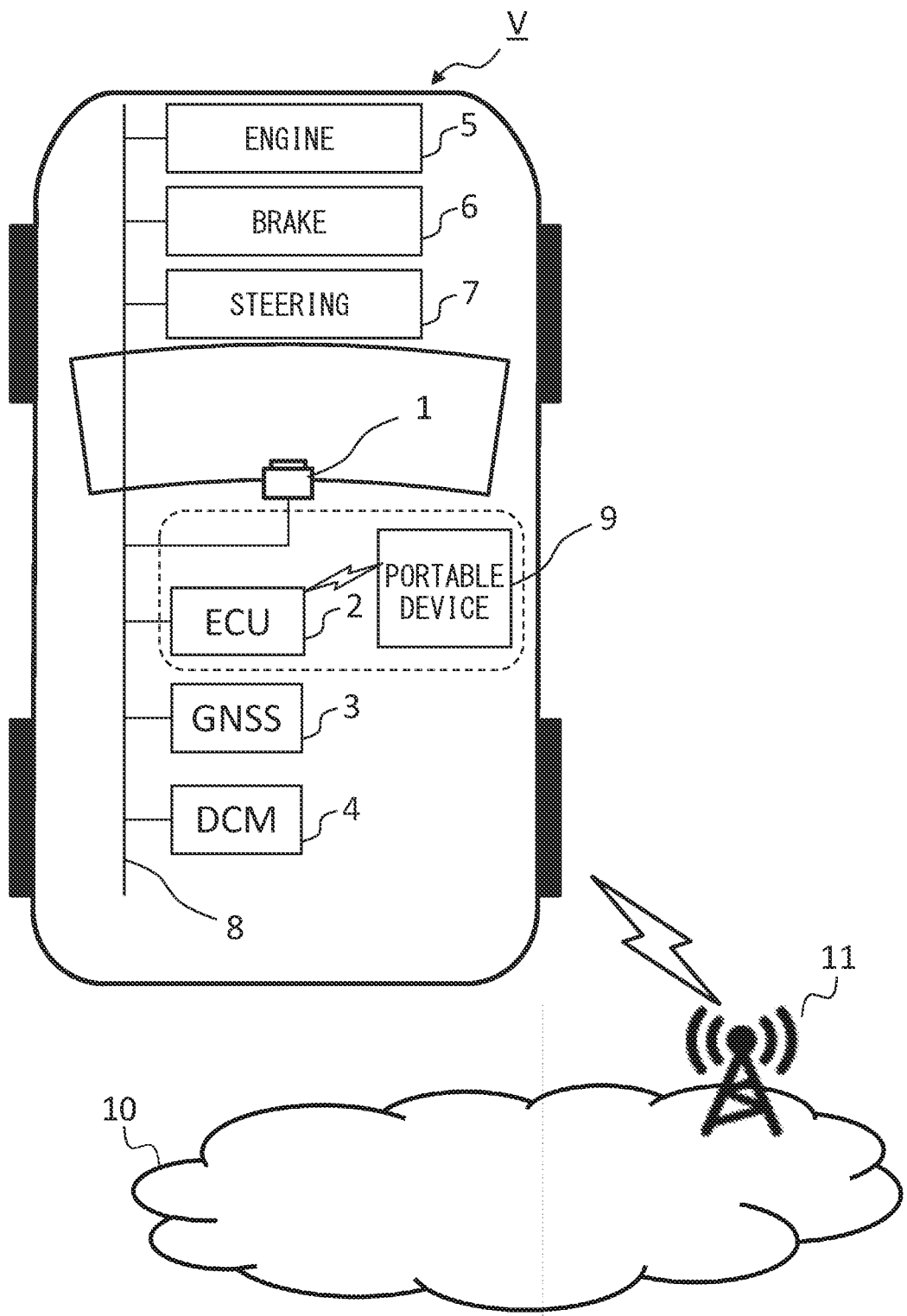
FIG. 2 is a diagram schematically illustrating a vehicle equipped with the automated driving system.

FIG. 1 is a diagram for briefly explaining the operations of the automated driving system. FIG. 2 is a diagram schematically illustrating a vehicle equipped with the automated driving system.

The vehicle V includes a camera 1, an electronic control unit (ECU) 2, a global navigation satellite system (GNSS) receiver 3 and a data communication module 4. The vehicle V also includes an engine 5, a brake 6 and a steering 7. The camera 1, the ECU 2, the GNSS receiver 3, the data communication module 4, the engine 5, the brake 6 and the steering 7 are connected to an in-vehicle network 8.

The camera 1 is an example of the circumstance sensor, takes pictures of surrounding circumstances of the vehicle V and outputs images thereof. The camera 1 is disposed in a front and upper area inside the vehicle so as to face forward in the traveling direction. The vehicle V may include a camera facing backward or sideways with respect to the traveling direction, as the circumstance sensor. The circumstance sensor may be a light detection and ranging (LIDAR) sensor or a radio detection and ranging (RADAR) sensor. The LIDAR sensor or the RADAR sensor generates a distance image whose pixels each have a value depending on the distance between the sensor and an object imaged on the corresponding pixel, based on the surrounding circumstances of the vehicle V.

The ECU 2 is an example of the travel control device. The configuration of the ECU 2 will be described later.

The GNSS receiver 3 outputs positional data, based on a signal transmitted from the artificial satellite. The data communication module 4 includes a communication interface circuit for connecting to a wireless base station 11 included in an external network 10.

The engine 5 supplies motive power to the vehicle V; the brake 6 reduces the travel speed of the vehicle V; and the steering 7 steers the vehicle V. The in-vehicle network 8 is a circuit for communicating in conformity with, for example, the controller area network (CAN).

The portable device 9, which is possessed by a driver who has got into the vehicle V, is located in the vehicle V together with the driver. The configuration of the portable device 9 will be described later. The automated driving system includes the ECU 2 and the portable device 9.

With reference to FIG. 1, as shown in a map M, the vehicle V travels along a route from a starting point S to a destination G. On the route, an event location E1 is set. The event location E1 is a location where the travel condition of the vehicle V is changed, and is set by the ECU 2, based on route data. The travel condition includes, for example, a travel lane, a travel speed, and whether the vehicle is automatically driven or not. Accordingly, the change of the travel condition includes, for example, a change of travel lanes, a change of travel speeds, and a start or end of the automated driving.

The ECU 2 controls travel of the vehicle V in an automated-driving control area from the present position of the vehicle V to a position at a predetermined distance ahead thereof. When the present position of the vehicle V is a location P1, the automated-driving control area is R1; when the present position of the vehicle V is a location P2, the automated-driving control area is R2.

The automated-driving control area R1 when the present position of the vehicle V is the location P1 includes no event location. F1 in FIG. 1 indicates an example of an image shown on a user interface 93 of the portable device 9 which is cooperatively operating with the ECU 2 when the present position of the vehicle V is the location P1. When the driver taps a cooperation stopping icon 93a included in the image shown on the user interface 93, the portable device 9 finishes the cooperative operation with the ECU 2, and shows an image for notifying it.

The automated-driving control area R2 when the present position of the vehicle V is the location P2 includes the event location E1. F21 in FIG. 1 indicates an example of an image shown on the user interface 93 of the portable device 9 which is cooperatively operating with the ECU 2 when the present position of the vehicle V is the location P2. When the driver performs an operational input, i.e., a tap on a cooperation stopping icon 93a included in the image shown on the user interface 93, the portable device 9 shows an image for notifying that the cooperative operation cannot be stopped, on the user interface 93, and ignores the received operational input, i.e., the tap on the cooperation stopping icon 93a.

F22 in FIG. 1 indicates an example of an image shown on the user interface 93 of the portable device 9 which is not cooperatively operating with the ECU 2 when the present position of the vehicle V is the location P2. In the case of F22, the portable device 9 is executing a music player application which is different from the cooperative operation with the ECU 2; and the user interface 93 shows an image of the music player application. At the location P2, the ECU 2 requests the portable device 9, which is not performing the cooperative operation, to do so. The portable device 9 shows an image for notifying that the execution of the cooperative operation is requested, on the user interface 93, instead of an image of the application which is being executed, or on top thereof.

Figure 3:
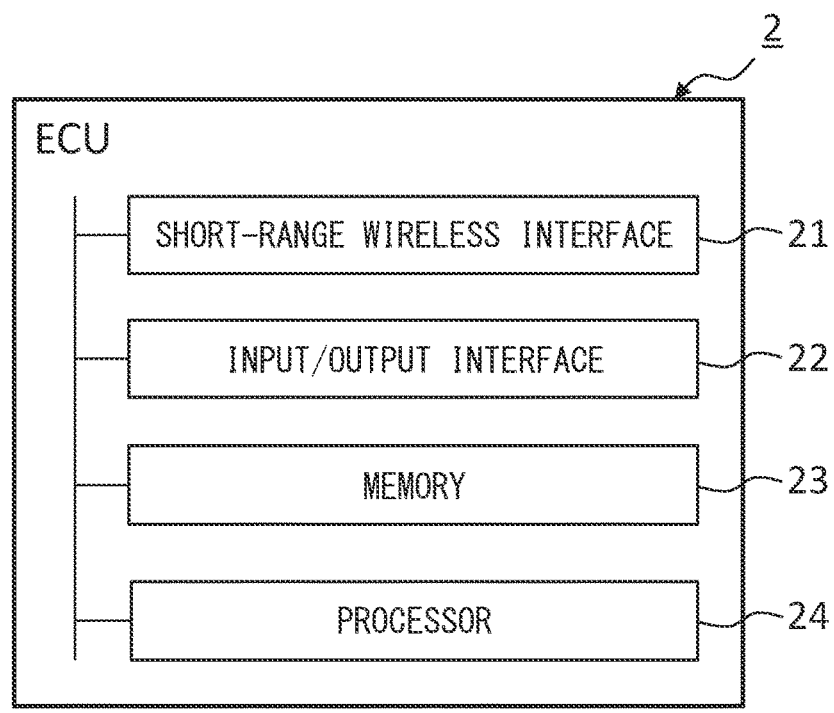
FIG. 3 is a schematic diagram of the hardware of the ECU.

FIG. 3 is a schematic diagram of the hardware of the ECU 2.

The ECU 2 cooperatively operates with the portable device 9. The ECU 2 requests the portable device to perform the cooperative operation if the event location is set in the automated-driving control area and if the cooperative operation is not performed. To this end, the ECU 2 includes a short-range wireless interface 21, an input/output interface 22, a memory 23 and a processor 24.

The short-range wireless interface 21 includes an interface circuit for transmitting and receiving data wirelessly between the ECU 2 and a device relatively close thereto. The short-range wireless interface 21 provides received data for the processor 24, and transmits data provided from the processor 24 to an external device. The short-range wireless interface 21 is a circuit for wireless communication conforming to a standard, such as Bluetooth (registered trademark), near field communication (NFC) and IEEE 802.11.

The input/output interface 22 is an example of a communication unit, and includes an interface circuit for inputting and outputting data between the ECU 2 and an external device. The input/output interface 22 provides inputted data for the processor 24, and outputs data provided from the processor 24 to an external device. The input/output interface 22 is a circuit for communicating in conformity with, for example, the controller area network (CAN).

The memory 23 is an example of a storage unit, and includes volatile and nonvolatile semiconductor memories. The memory 23 stores various kinds of data used for processing by the processor 24, such as route data received from the portable device 9 and data for generating notification data to be transmitted to the portable device 9.

The processor 24 is an example of a control unit, and includes one or more processors and peripheral circuits thereof. The processor 24 may further include other arithmetic circuits, such as a logical operation unit, a numerical operation unit and a graphical processing unit. The processor 24 repeatedly executes a series of processes described later while the vehicle V is traveling.

Figure 4:
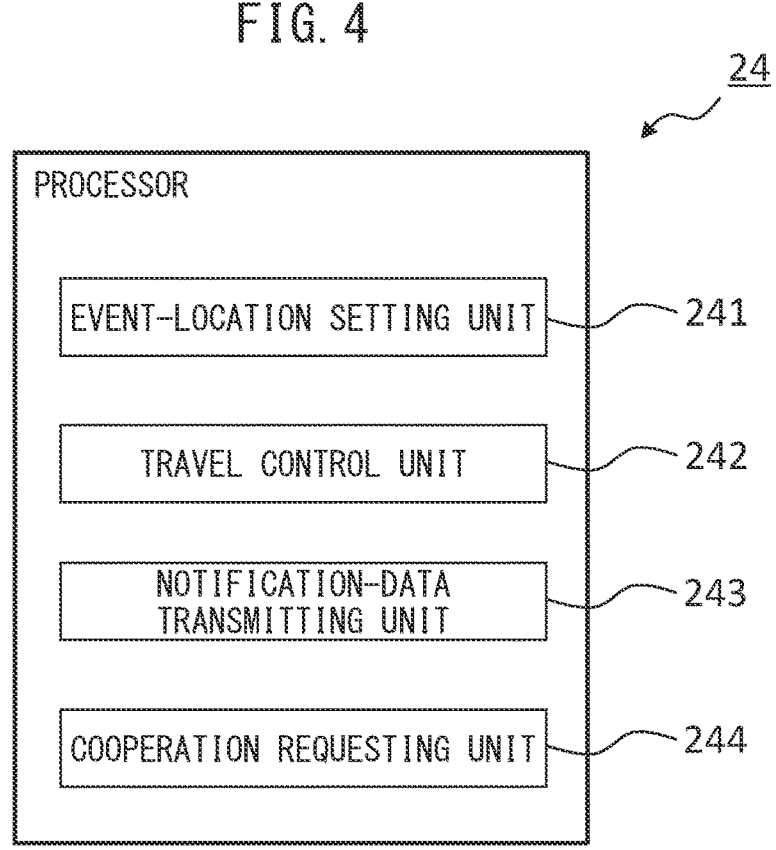
FIG. 4 is a functional block diagram of the processor included in the ECU.

FIG. 4 is a functional block diagram of the processor 24 included in the ECU 2.

As its functional blocks, the processor 24 of the ECU 2 includes an event-location setting unit 241, a travel control unit 242, a notification-data transmitting unit 243 and a cooperation requesting unit 244. These units included in the processor 24 are functional modules implemented by a program executed on the processor 24, or may be implemented on the ECU 2 as an independent integrated circuit, a microprocessor or a firmware.

The event-location setting unit 241 receives route data indicating a route from a starting point to a destination from the portable device 9 through the short-range wireless interface 21. The event-location setting unit 241 sets an event location on the route, based on the received route data, and stores it in the memory 23. The event-location setting unit 241 also transmits data on the event location to the portable device 9 through the short-range wireless interface 21.

The event location is a location on the route where the travel condition of the vehicle V is changed. For example, a location where the travel lane is changed or branched off corresponds to an event location. A location where the automated driving starts or ends also corresponds to an event location.

The travel control unit 242 controls travel of the vehicle V in the automated-driving control area, based on the route data and images acquired by the camera 1. The travel control unit 242 inputs an image acquired by the camera 1 to a classifier which has been trained to detect features shown in the image, and thereby identifies the features around the vehicle V. The features herein refer to objects or indications on or near the road, and include, for example, lines drawn on the road for separating lanes, and traveling vehicles other than the vehicle V. The travel control unit 242 outputs control signals to the engine 5 and other components through the in-vehicle network 8, based on the route data and the features identified in the images acquired by the camera 1, so that the vehicle V appropriately travels on a lane. For example, the travel control unit 242 outputs control signals to the engine 5 and other components through the in-vehicle network 8 so as to make changes of lanes and left or right turns which are necessary to travel along a route. If such a change of lanes or a left or right turn, i.e., a change of the travel condition is not necessary, the travel control unit 242 outputs control signals to the engine 5 and other components through the in-vehicle network 8 so as to travel along a lane.

The travel control unit 242 transmits data on the automated-driving control area to the portable device 9 through the short-range wireless interface 21.

The notification-data transmitting unit 243 transmits notification data for notifying the driver of a change of the travel condition to the portable device 9 through the short-range wireless interface 21. The notification data is, for example, image data or text data to be shown on a display of the portable device 9. Alternatively, the notification data may be voice data to be played back by a speaker of the portable device 9, or an identifier for specifying image data, text data or voice data stored in the portable device 9 in advance.

The cooperation requesting unit 244 transmits a cooperation requesting signal asking for the execution of the cooperative operation to the portable device 9 through the short-range wireless interface 21 if the event location is set in the automated-driving control area and if the cooperative operation is not performed. The cooperation requesting signal is a predetermined signal such that upon receiving it, the portable device 9 performs processing necessary for the cooperative operation. If communication with the portable device 9 through the short-range wireless interface 21 is not established, the cooperation requesting unit 244 may transmit the cooperation requesting signal to the portable device 9 through the input/output interface 22. In this case, the cooperation requesting unit 244 transmits the cooperation requesting signal through the input/output interface 22 and the wireless base station 11 to a server (not shown) connected to the external network 10. The server then transmits the cooperation requesting signal to the portable device 9 through the wireless base station 11.

Figure 5:
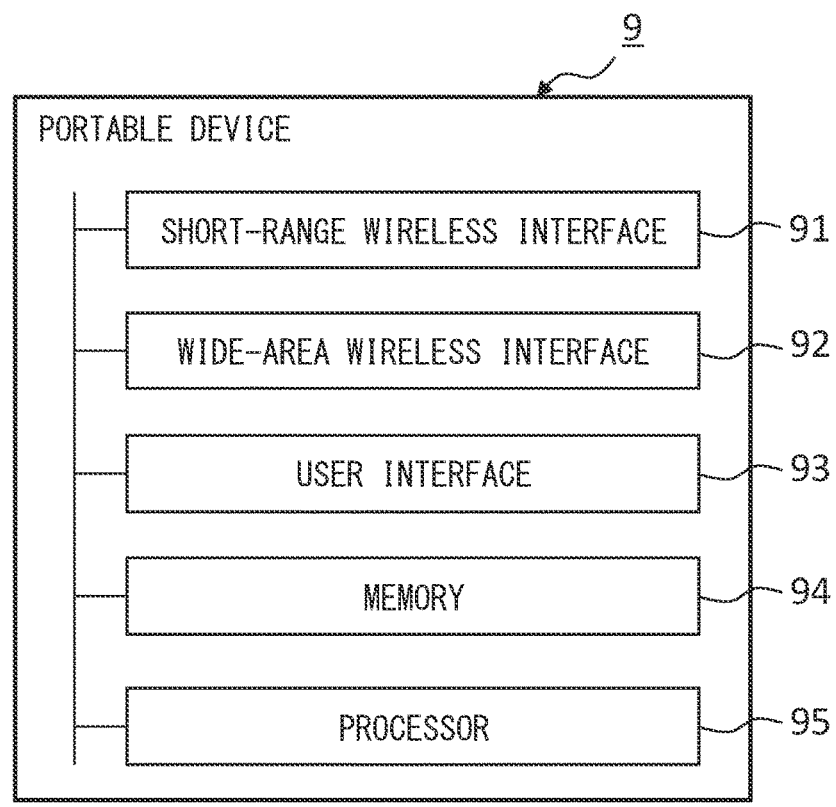
FIG. 5 is a schematic diagram of the hardware of the portable device.

FIG. 5 is a schematic diagram of the hardware of the portable device 9.

The portable device 9 is a data communication terminal, such as a smartphone or a tablet, possessed by the driver of the vehicle V, and cooperatively operates with the ECU 2. Upon receiving an operational input to stop the cooperative operation, the portable device 9 ignores the received operational input if the event location is set in the automated-driving control area. To this end, the portable device 9 includes a short-range wireless interface 91, a wide-area wireless interface 92, a user interface 93, a memory 94 and a processor 95.

The short-range wireless interface 91 includes an interface circuit for transmitting and receiving data wirelessly between the portable device 9 and a device relatively close thereto. The short-range wireless interface 91 provides received data for the processor 95, and transmits data provided from the processor 95 to an external device. The short-range wireless interface 91 is a circuit for wireless communication conforming to a standard, such as Bluetooth (registered trademark), NFC and IEEE 802.11.

The wide-area wireless interface 92 includes an interface circuit for the portable device 9 to perform wide-area wireless communication. The wide-area wireless interface 92 is a circuit for transmitting and receiving data between the portable device 9 and the wireless base station 11, for example. The wide-area wireless interface 92 provides received data for the processor 95, and transmits data provided from the processor 95 to the wireless base station 11.

The user interface 93 is a device for outputting data to a user or receiving an input from a user. Devices, such as a display and a speaker, are examples of the user interface 93 outputting data. The display is an image display device, such as a liquid crystal display or an organic electroluminescent display, and shows images according to image data requested by the processor 95. The speaker is a device for outputting a voice. The user interface 93 outputs, for example, an image or a voice according to a signal generated by the processor 95.

Further, devices, such as a touch panel, key buttons and a microphone, are examples of the user interface 93 receiving an input. The user can input letters, numerals, symbols, and instructions to specific coordinates on the screen by using the user interface 93. When operated by the user, the user interface 93 generates a signal corresponding to the operation. The generated signal is provided as a user instruction to the processor 95.

A touch panel which includes a display showing images and a light transmissive touch sensor layered thereon is an example of the user interface 93, the touch sensor outputting a signal depending on a position to which a finger comes close.

The memory 94 is an example of a storage unit, and includes volatile and nonvolatile semiconductor memories. The memory 94 stores various kinds of data used for processing by the processor 95, such as the route data, and data on the event location and the automated-driving control area received from the ECU 2.

The processor 95 is an example of a control unit, and includes one or more processors and peripheral circuits thereof. The processor 95 may further include other arithmetic circuits, such as a logical operation unit, a numerical operation unit and a graphical processing unit. The processor 95 executes a series of processes described later in accordance with the operation of the driver.

Figure 6:
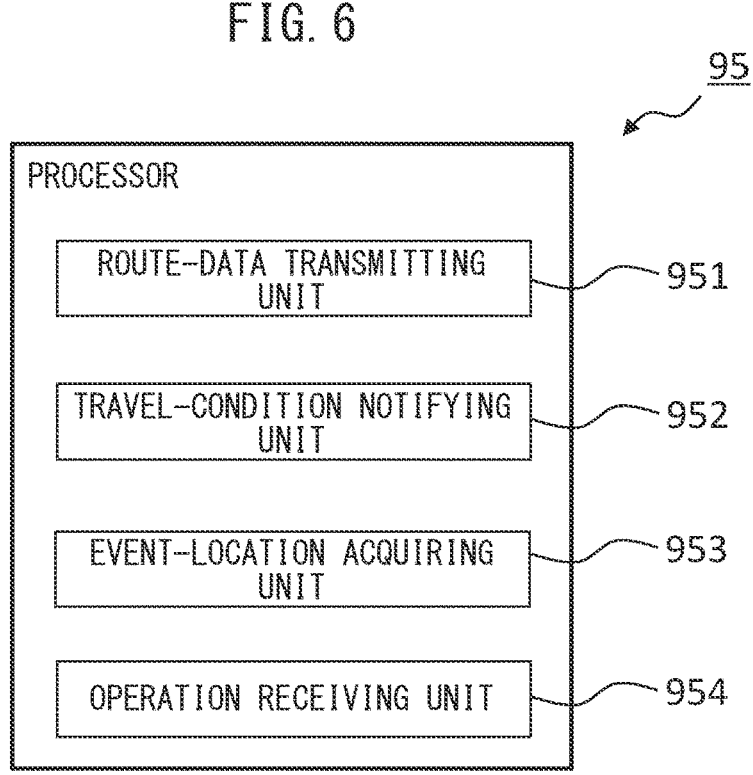
FIG. 6 is a functional block diagram of the processor included in the portable device.

FIG. 6 is a functional block diagram of the processor 95 included in the portable device 9.

As its functional blocks, the processor 95 of the portable device 9 includes a route-data transmitting unit 951, a travel-condition notifying unit 952, an event-location acquiring unit 953 and an operation receiving unit 954. These units included in the processor 95 are functional modules implemented by a program executed on the processor 95, or may be implemented on the portable device 9 as an independent integrated circuit, a microprocessor or a firmware.

The route-data transmitting unit 951 receives a driver's operational input to specify a starting point and a destination through the user interface 93. The route-data transmitting unit 951 communicates through the wide-area wireless interface 92 with a route data server (not shown) connected to the external network 10, and thereby acquires route data corresponding to the starting point and the destination and stores it in the memory 94. The route data server searches for a route corresponding to the received starting point and destination in accordance with a predetermined route search program, and transmits the route data to the portable device 9. The predetermined route search program is a program for searching a route by, for example, Dijkstra's algorithm. The route-data transmitting unit 951 then transmits the route data indicating a route from the starting point to the destination to the ECU 2 through the short-range wireless interface 91.

The travel-condition notifying unit 952 receives notification data for notifying the driver of a change of the travel condition of the vehicle V through the short-range wireless interface 91. The travel-condition notifying unit 952 causes the display, which is an example of the user interface 93, to show a predetermined image or causes the speaker, which is an example of the user interface 93, to output a predetermined voice, based on the received notification data, thereby notifying the driver of a change of the travel condition.

The event-location acquiring unit 953 receives data on the event location from the ECU 2 through the short-range wireless interface 91, and stores it in the memory 94. The event location is a location where the travel condition of the vehicle V is changed, and is set by the ECU 2, based on the route data. The event-location acquiring unit 953 also receives data on the automated-driving control area from the ECU 2 through the short-range wireless interface 91, and stores it in the memory 94. The automated-driving control area is an area of the route from the present position of the vehicle V to a position at a predetermined distance ahead thereof. The event-location acquiring unit 953 may identify the automated-driving control area, based on the present position of the vehicle V and a predetermined distance stored in the memory 94. As for the present position of the vehicle V, the event-location acquiring unit 953 receives positional data acquired by the GNSS receiver 3, from the ECU 2 through the short-range wireless interface 91. Alternatively, the present position of the vehicle V may be identified based on positional data acquired by a GNSS receiver (not shown) included in the portable device 9.

The operation receiving unit 954 receives an operational input to stop the cooperative operation in the portable device 9 through the touch panel, which is an example of the user interface 93. If the event location is set in the automated-driving control area, the operation receiving unit 954 ignores the received operational input.

If the event location is set in the automated-driving control area, the operation receiving unit 954 may cause the display, which is an example of the user interface 93, to show a predetermined image, or cause the speaker, which is an example of the user interface 93, to output a predetermined voice, thereby notifying the driver of a warning message.

The operation receiving unit 954 may stop the cooperative operation if consent of the driver to stop it is confirmed.

The operation receiving unit 954 may include a request for approval for stopping the cooperative operation into the warning message and receive an operational input of approval by the driver responding thereto, thereby confirming consent of the driver to stop the cooperative operation. For example, this warning message is a message "Stop of cooperation may restrict automated driving function. Would you like to stop cooperation? [OK] [Cancel]" for warning the driver and asking him/her to decide whether it is stopped. If an operational input of approval (e.g., a tap on the [OK] button) is received through the user interface 93 as a response to such a warning message, the operation receiving unit 954 stops the cooperative operation.

If an approval flag indicating driver's general approval for stopping the cooperative operation is stored in the memory 94, the operation receiving unit 954 stops the cooperative operation on the supposition that consent of the driver to stop it has been confirmed. The processor 95 of the portable device 9 stores the approval flag in the memory 94 in response to a predetermined operational input on a setting screen of an application executed on the portable device 9.

Figure 7:
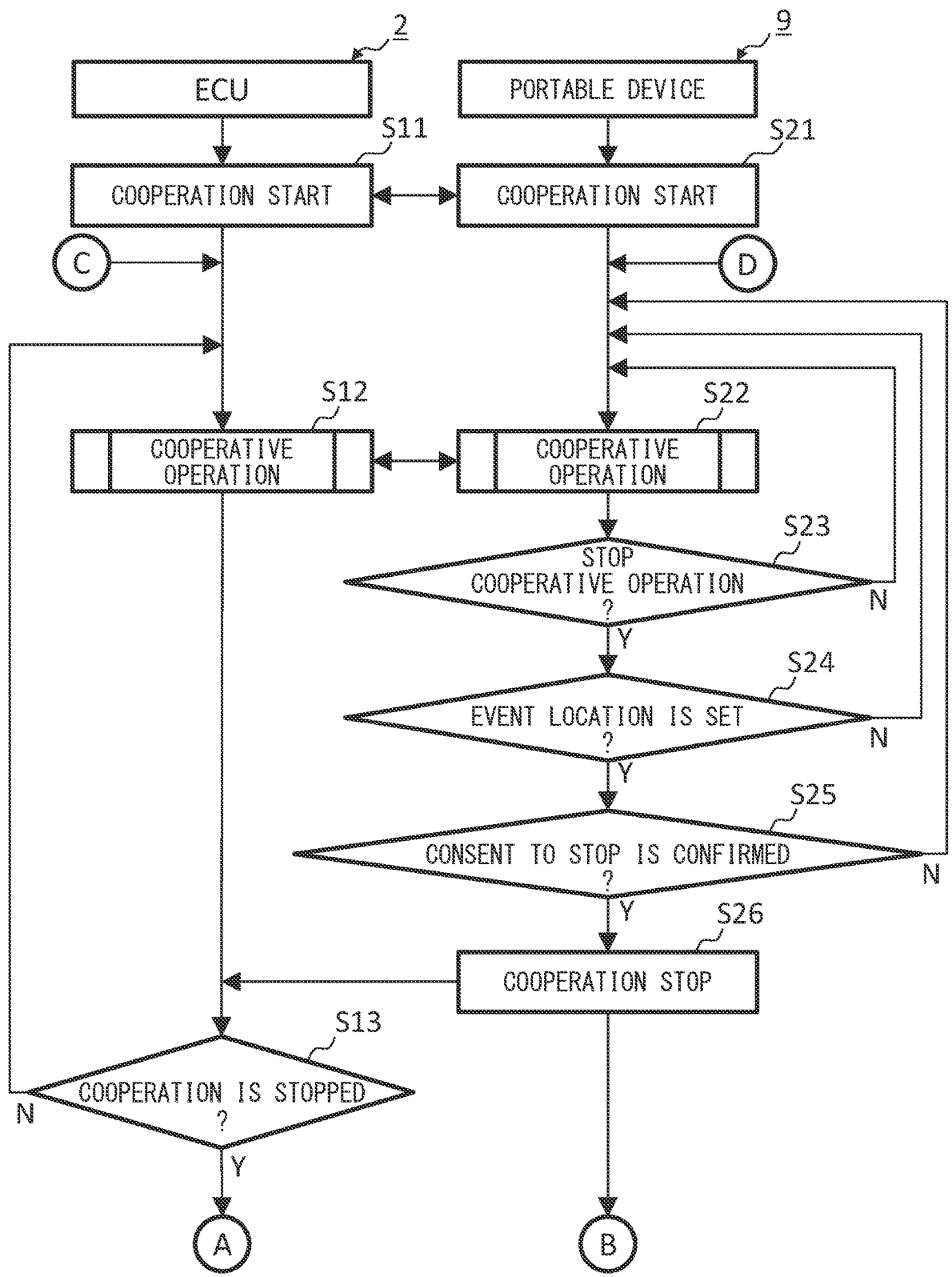
FIG. 7 shows a first part of the sequence of processes performed by the automated driving system.
Figure 8:
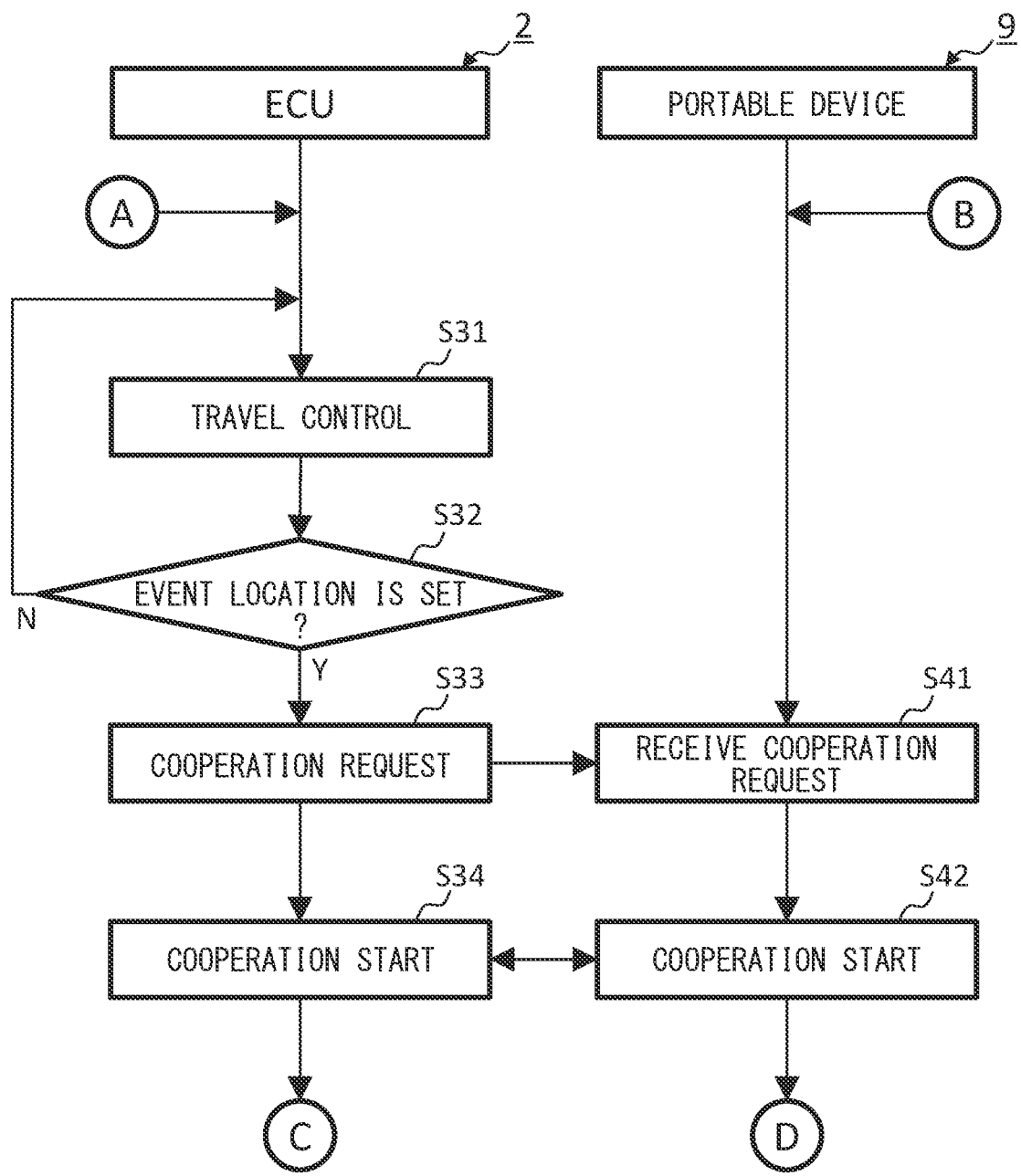
FIG. 8 shows a second part of the sequence of processes performed by the automated driving system.

FIGS. 7 and 8 show the sequence of processes performed by the automated driving system. The processor 24 of the ECU 2 included in the automated driving system repeats the operations shown in FIGS. 7 and 8 while the vehicle V is traveling. The processor 95 of the portable device 9 performs the operations shown in FIGS. 7 and 8 in accordance with a driver's operational input.

First, the processor 24 of the ECU 2 and the processor 95 of the portable device 9 each perform start processing of the cooperative operation (steps S11 and S21). The start processing of the cooperative operation includes connection of short-range wireless communication and execution of a cooperative operation application. Connection of Bluetooth (registered trademark), which is an example of the short-range wireless communication, is established by a request from the ECU 2 to the portable device 9 to start pairing and by requests and transmission of PIN codes between the ECU 2 and the portable device 9. The cooperative operation application is an application program for performing the cooperative operation described later, and is stored in the memory 23 of the ECU 2 and in the memory 94 of the portable device 9.

The processor 24 of the ECU 2 is set so as to execute the cooperative operation application on starting. The processor 95 of the portable device 9 executes the cooperative operation application in accordance with an operational input received through the user interface 93. If execution of the cooperative operation application of the portable device 9 is detected by the cooperative operation application of the ECU 2 with the connection of the short-range wireless communication being established, the processor 24 of the ECU 2 and the processor 95 of the portable device 9 each perform the cooperative operation (steps S12 and S22).

Figure 9:
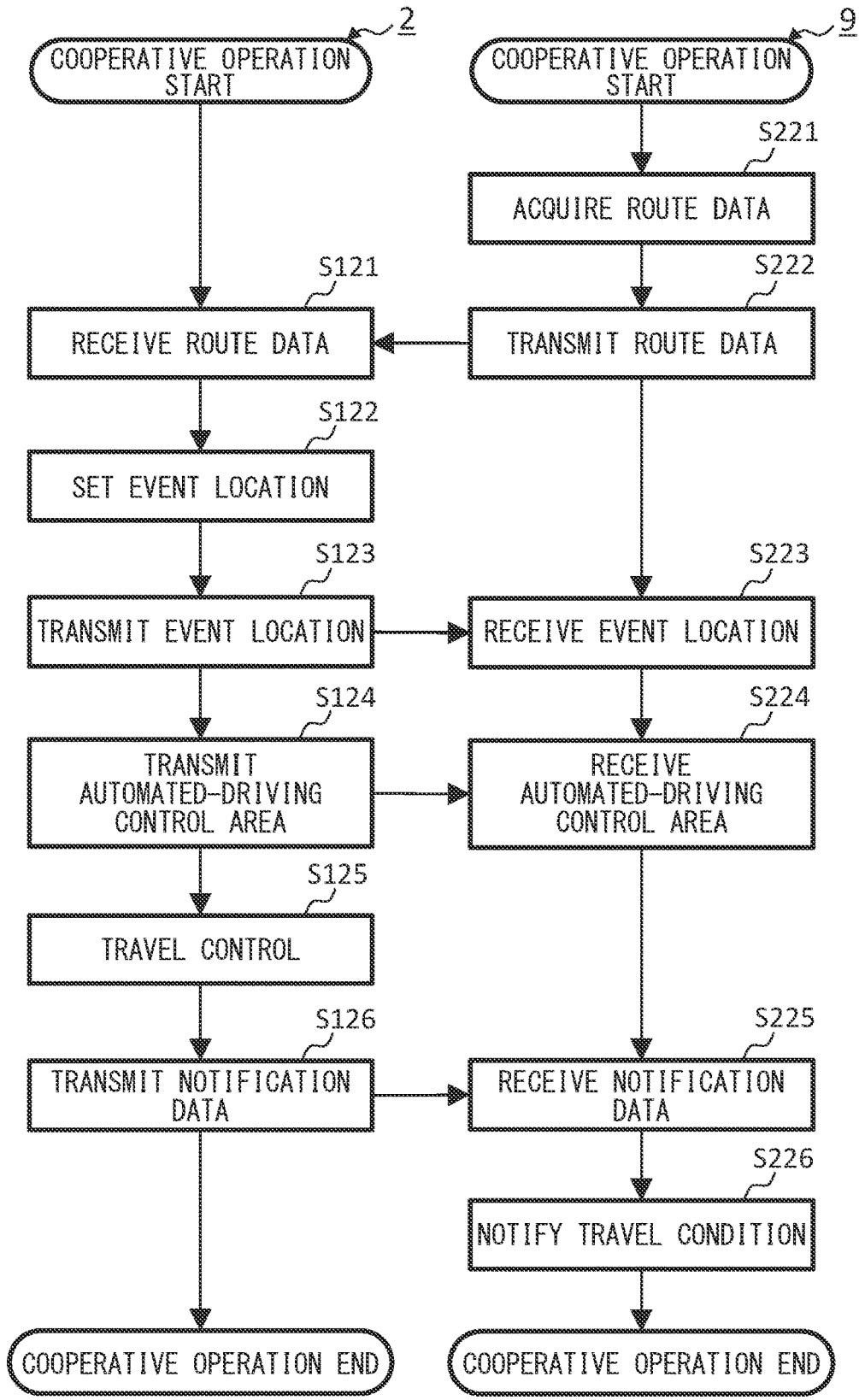
FIG. 9 shows the sequence of processes in the cooperative operation.

FIG. 9 shows the sequence of processes in the cooperative operation.

Upon starting the cooperative operation, the route-data transmitting unit 951 of the portable device 9 acquires route data through the wide-area wireless interface 92 (step S221), and transmits the acquired route data to the ECU 2 through the short-range wireless interface 91 (step S222).

The event-location setting unit 241 of the ECU 2 receives the route data from the portable device 9 through the short-range wireless interface 21 (step S121). The event-location setting unit 241 sets an event location on the route, based on the received route data (step S122), and transmits data indicating the event location to the portable device 9 through the short-range wireless interface 21 (step S123).

The event-location acquiring unit 953 of the portable device 9 receives the data indicating the event location from the ECU 2 through the short-range wireless interface 91, and stores it in the memory 94 (step S223).

The travel control unit 242 of the ECU 2 transmits data indicating an automated-driving control area to the portable device 9 through the short-range wireless interface 21 (step S124).

The event-location acquiring unit 953 of the portable device 9 receives the data indicating the automated-driving control area from the ECU 2 through the short-range wireless interface 91, and stores it in the memory 94 (step S224).

The travel control unit 242 of the ECU 2 controls travel of the vehicle V in the automated-driving control area, based on the route data and images acquired by the camera 1, (step S125).

The notification-data transmitting unit 243 of the ECU 2 transmits notification data for notifying the driver of a change of the travel condition to the portable device 9 through the short-range wireless interface 21 (step S126), and ends the cooperative operation in the ECU 2.

The travel-condition notifying unit 952 of the portable device 9 receives the notification data through the short-range wireless interface 91 (step S225). The travel-condition notifying unit 952 notifies the driver of the change of the travel condition, based on the received notification data (step S226), and ends the cooperative operation in the portable device 9.

In the above cooperative operation, acquisition of the route data (step S221) and transmission thereof (step S222) by the route-data transmitting unit 951 of the portable device 9 may not be performed in every execution of the cooperative operation. For example, during traveling, the route-data transmitting unit 951 may repeatedly use the route data acquired when the cooperative operation is performed for the first time. Alternatively, the route-data transmitting unit 951 may acquire the route data every predetermined number of times or at predetermined time intervals. The route-data transmitting unit 951 may transmit the route data to the ECU 2 when the newly acquired data is different from the previously acquired data.

Setting of the event location (step S122) and transmission thereof (step S123) by the event-location setting unit 241 of the ECU 2 may not be performed in every execution of the cooperative operation. For example, the event-location setting unit 241 may transmit the data on the event location to the portable device 9 when setting of the event location is changed.

Transmission of the notification data by the notification-data transmitting unit 243 of the ECU 2 (step S126) may not be performed in every execution of the cooperative operation. For example, the notification-data transmitting unit 243 may transmit the notification data to the portable device 9 only when a change of the travel condition occurs.

With reference to FIG. 7 again, the operation receiving unit 954 determines whether or not an operational input to stop the cooperative operation is received (step S23). If it is determined that the operation receiving unit 954 has not received an operational input to stop the cooperative operation (No in step S23), the process returns to step S22 and the processor 95 of the portable device 9 performs the cooperative operation.

If it is determined that the operation receiving unit 954 has received an operational input to stop the cooperative operation (Yes in step S23), the operation receiving unit 954 determines whether or not the event location is set in the automated-driving control area (step S24). If it is determined by the operation receiving unit 954 that the event location is not set in the automated-driving control area (No in step S24), the process returns to step S22 and the processor 95 of the portable device 9 performs the cooperative operation.

If it is determined by the operation receiving unit 954 that the event location is set in the automated-driving control area (Yes in step S24), the operation receiving unit 954 determines whether or not consent of the driver to stop the cooperative operation is confirmed (step S25). If it is determined by the operation receiving unit 954 that consent of the driver to stop the cooperative operation is not confirmed (No in step S25), the process returns to step S22 and the processor 95 of the portable device 9 performs the cooperative operation.

If it is determined by the operation receiving unit 954 that consent of the driver to stop the cooperative operation is confirmed (Yes in step S25), the processor 95 of the portable device 9 stops the cooperative operation and notifies the ECU 2 of the stop of the cooperative operation (step S26), and then performs the processing of step S41 and the subsequent step in FIG. 8. The stop of the cooperative operation includes disconnection of the short-range wireless communication and termination or stop of the cooperative operation application of the portable device 9. Notification of the stop of the cooperative operation to the ECU 2 is performed by transmitting a predetermined signal indicating the stop of the cooperative operation to the ECU 2 through the short-range wireless interface 91. Alternatively, the processor 95 of the portable device 9 may not explicitly notify the stop of the cooperative operation to the ECU 2. In this case, the processor 24 of the ECU 2 detects the stop of the cooperative operation in the portable device 9, based on the fact that the portable device 9 does not respond.

The processor 24 of the ECU 2 determines whether or not the portable device 9 has stopped the cooperative operation (step S13). If the portable device 9 has not stopped the cooperative operation (No in step S13), the process returns to step S12 and the processor 24 of the ECU 2 performs the cooperative operation. If the portable device 9 has stopped the cooperative operation (Yes in step S13), the processor 24 of the ECU 2 performs the processing of step S31 and the subsequent steps in FIG. 8.

In FIG. 8, the travel control unit 242 of the ECU 2 controls travel of the vehicle V in the automated-driving control area, based on the route data and images acquired by the camera 1 (step S31).

The cooperation requesting unit 244 of the ECU 2 determines whether or not the event location is set in the automated-driving control area (step S32). If it is determined by the cooperation requesting unit 244 that the event location is not set in the automated-driving control area (No in step S32), the process of the processor 24 of the ECU 2 returns to step S31 and the travel control unit 242 performs the travel control.

If it is determined that the event location is set in the automated-driving control area (Yes in step S32), the cooperation requesting unit 244 requests the portable device 9 to perform the cooperative operation (step S33). The cooperation requesting unit 244 transmits a cooperation requesting signal to the portable device 9 through the short-range wireless interface 21, thereby requesting the portable device 9 to perform the cooperative operation. If connection with the portable device 9 through the short-range wireless interface 21 is not established, the cooperation requesting unit 244 may transmit the cooperation requesting signal through the input/output interface 22 to a server connected to the external network 10. In this case, the server transmits the cooperation requesting signal to the portable device 9 through the wireless base station 11.

The processor 95 of the portable device 9 receives the cooperation requesting signal (step S41). The processor 24 of the ECU 2 and the processor 95 of the portable device 9 then perform the processing to start the cooperative operation (steps S34 and S42), and each perform the processing of steps S12 and S22 and the subsequent steps in FIG. 7. Since the processing of steps S34 and S42 is the same as that of steps S11 and S21, explanation thereof is omitted herein.

According to a modified example, if the cooperation requesting signal is received in step S41 of FIG. 8, the processor 95 of the portable device 9 may store the state of operations of the portable device 9 in the memory 94 before starting the cooperative operation. The state of operations of the portable device includes the state of connection of the short-range wireless interface 91, the state of the screen of the display, which is an example of the user interface 93, and the state of execution of the application by the processor 95.

In this case, when the change of the travel condition of the vehicle V at the event location is finished, the processor 24 of the ECU 2 transmits an event ending notice to the portable device 9 through the short-range wireless interface 21. The event ending notice is a signal indicating that the change of the travel condition of the vehicle V at the event location is finished. Then, upon receiving the event ending notice, the processor 95 of the portable device 9 returns the state of operations thereof to the state prior to the start of the cooperative operation stored in the memory 94. By these operations, the driver can appropriately receive a notice relating to an event of the automated driving and use the portable device 9 in a desired state of operations.

Note that those skilled in the art can apply various changes, substitutions and modifications without departing from the spirit and scope of the present invention.

What is claimed is:

1. An automated driving system comprising:
   a travel control device controlling travel of a vehicle; and
   a portable device possessed by a driver of the vehicle,
   the automated driving system automatically driving the vehicle by cooperative operation of the travel control device and the portable device,
   wherein in the cooperative operation,
      the portable device transmits route data indicating a route from a starting point to a destination to the travel control device,
      the travel control device
         sets an event location on the route, based on the route data, the event location being a location where a travel condition of the vehicle is changed,
         controls travel of the vehicle in an automated-driving control area of the route from the present position of the vehicle to a position at a predetermined distance ahead thereof, based on the route data and circumstance data indicating circumstances around the vehicle, the circumstance data being acquired by a circumstance sensor, and
         transmits notification data for notifying the driver of a change of the travel condition to the portable device, and
      the portable device notifies the driver of the change of the travel condition, based on the notification data, and
   wherein upon receiving an operational input to stop the cooperative operation, the portable device notifies the driver of a warning message or ignores the received operational input if the event location is set in the automated-driving control area,
   while the portable device stops the cooperative operation if the event location is not set in the automated-driving control area.

2. The automated driving system according to claim 1, wherein
   the warning message is a message asking for consent of the driver to stop the cooperative operation, and
   the portable device stops the cooperative operation if the consent of the driver is confirmed.

3. A portable device for automatically driving a vehicle by cooperative operation with a travel control device controlling travel of the vehicle, the portable device comprising a processor configured to:
   transmit, in the cooperative operation, route data indicating a route from a starting point to a destination to the travel control device,
   notify, in the cooperative operation, a driver of the vehicle that a travel condition of the vehicle is changed, based on notification data received from the travel control device,
   acquire, in the cooperative operation, data indicating an event location from the travel control device, the event location being a location where a travel condition of the vehicle is changed and being set based on the route data, and
   upon receiving an operational input to stop the cooperative operation, notify the driver of a warning message or ignores the received operational input if the event location is set in an area of the route from the present position of the vehicle to a position at a predetermined distance ahead thereof,
   stops cooperative operation if the event location is not set in an area of the route from the present position of the vehicle to a position at a predetermined distance ahead thereof.

4. An automated driving system comprising:
   a travel control device controlling travel of a vehicle; and
   a portable device possessed by a driver of the vehicle,
   the automated driving system automatically driving the vehicle by cooperative operation of the travel control device and the portable device,
   wherein in the cooperative operation,
      the portable device transmits route data indicating a route from a starting point to a destination to the travel control device,
      the travel control device
         sets an event location on the route, based on the route data, the event location being a location where a travel condition of the vehicle is changed,
         controls travel of the vehicle in an automated-driving control area of the route from the present position of the vehicle to a position at a predetermined distance ahead thereof, based on the route data and circumstance data indicating circumstances around the vehicle, the circumstance data being acquired by a circumstance sensor, and
         transmits notification data for notifying the driver of a change of the travel condition to the portable device, and
      the portable device notifies the driver of the change of the travel condition, based on the notification data, and
   wherein the travel control device requests the portable device to start the cooperative operation if the event location is set in the automated-driving control area and if the cooperative operation is not performed.

5. The automated driving system according to claim 4, wherein
   the travel control device transmits an event ending notice to the portable device when the travel control device requests the portable device to start the cooperative operation and the change of the travel condition of the vehicle at the event location is finished, and
   upon receiving the event ending notice, the portable device returns to the state prior to the start of the cooperative operation.

6. A travel control device for automatically driving a vehicle by cooperative operation with a portable device possessed by a driver of the vehicle, the travel control device comprising a processor configured to:
   receive, in the cooperative operation, route data indicating a route from a starting point to a destination from the portable device and sets an event location on the route, based on the received route data, the event location being a location where a travel condition of the vehicle is changed, control, in the cooperative operation, travel of the vehicle in an automated-driving control area of the route from the present position of the vehicle to a position at a predetermined distance ahead thereof, based on the route data and circumstance data indicating circumstances around the vehicle, the circumstance data being acquired by a circumstance sensor, transmit, in the cooperative operation, notification data for notifying the driver of a change of the travel condition to the portable device, and request the portable device to perform the cooperative operation if the event location is set in the automated-driving control area and if the cooperative operation is not performed.

* * * * *